(12) United States Patent
Tewinkle

(10) Patent No.: US 8,212,197 B2
(45) Date of Patent: Jul. 3, 2012

(54) IMAGE SENSOR WITH INTEGRATION TIME COMPENSATION

(75) Inventor: Scott L. Tewinkle, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 113 days.

(21) Appl. No.: 12/496,971

(22) Filed: Jul. 2, 2009

(65) Prior Publication Data

US 2011/0001037 A1    Jan. 6, 2011

(51) Int. Cl.
*H01L 27/00* (2006.01)
*H01J 40/14* (2006.01)
*H03K 17/78* (2006.01)
*H04N 3/14* (2006.01)
*H04N 1/04* (2006.01)

(52) U.S. Cl. .......... 250/208.1; 250/214 R; 250/214 SW; 348/297; 358/482

(58) Field of Classification Search ............... 250/208.1, 250/214.1, 214 R, 214 SW, 214 LS, 214 A, 250/214 LA, 214 AL, 214 G, 214 B; 348/297–298, 348/302, 295, 300, 308, 309, 301; 358/482, 358/483
See application file for complete search history.

(56) References Cited

U.S. PATENT DOCUMENTS

| | | | |
|---|---|---|---|
| 4,335,405 A * | 6/1982 | Sakane et al. ................. | 348/297 |
| 5,148,268 A | 9/1992 | Tandon et al. | |
| 5,519,514 A | 5/1996 | TeWinkle | |
| 5,552,828 A | 9/1996 | Perregaux | |
| 6,014,160 A | 1/2000 | TeWinkle et al. | |
| 6,097,021 A * | 8/2000 | Aswell et al. ............... | 250/208.1 |
| 6,654,056 B1 | 11/2003 | Perregaux et al. | |
| 6,683,646 B2 | 1/2004 | Hosier et al. | |
| 6,797,933 B1 * | 9/2004 | Mendis et al. ............. | 250/208.1 |
| 2002/0180875 A1 * | 12/2002 | Guidash ........................ | 348/280 |
| 2005/0173616 A1 * | 8/2005 | Jang ........................... | 250/208.1 |
| 2006/0274174 A1 | 12/2006 | TeWinkle | |

OTHER PUBLICATIONS

U.S. Appl. No. 12/188,240, TeWinkle.

* cited by examiner

*Primary Examiner* — Georgia Y Epps
*Assistant Examiner* — Don Williams
(74) *Attorney, Agent, or Firm* — Simpson & Simpson, PLLC

(57) ABSTRACT

A photosensitive apparatus including a plurality of photosensor chips and a first common line for applying a first external integration signal to each of the plurality of photosensor chips. Each photosensor chip includes a first set of photosensors having an edge pixel and an interior pixel and a control portion for accepting the first external integration signal, the first external integration signal causing an edge pixel integration signal and an interior pixel integration signal for the first set of photosensors. The control portion includes a first signal adjuster effectively altering the first external integration signal to cause the edge pixel integration signal and the interior pixel integration signal for the first set of photosensors.

11 Claims, 7 Drawing Sheets

IMAGE SENSOR WITH INTEGRATION TIME COMPENSATION

INCORPORATION BY REFERENCE

The following co-pending application is incorporated herein by reference in its entirety: U.S. patent application Ser. No. 12/188,240, filed Aug. 8, 2008; and, the following patents are incorporated herein by reference in their entireties: U.S. Pat. Nos. 5,519,514; 5,148,268; and, 6,683,646.

TECHNICAL FIELD

The present invention relates to image sensor arrays used in input scanners, such as in digital copiers or facsimile machines, or in digital cameras.

BACKGROUND

Image sensor arrays typically comprise a linear array of photosensors which raster scan an image bearing surface or document and convert the microscopic image areas viewed by each photosensor to image signal charges. Following an integration period, the image signal charges are transferred and amplified as an analog video signal to a common output line or bus through successively actuated multiplexing transistors.

For high-performance image sensor arrays, one possible design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one design, an array includes 20 silicon chips, butted end-to-end, with each chip having active photosensors spaced at 400 or more photosensors per inch.

Further, in a full-color scanner, as would be used in color copying, there may be provided three or more linear arrays on each chip, each array filtered to receive a single primary color. As described in U.S. Pat. No. 5,519,514, each linear array on a chip may be desired to be independently controllable in some respects, particularly in terms of "integration time." Integration time is, broadly speaking, the length a particular photosensor is exposed to light from a small area on the original image being scanned, to yield a pixel of data. In the case of a color apparatus, each of three or more primary-color photosensors will view the substantially same small area in the original image, to yield full-color image data. In various situations, the integration times associated with different-color linear arrays on a single chip may be desired to be finely adjusted.

Moreover, due to manufacturing tolerances within the process of creating linear arrays, it has been found that the pixels located at each edge of a respective linear array (edge pixels) and the pixels located between the edge pixels (interior pixels) require different integration times in order to balance the output of each respective pixel within the linear array when all pixels are exposed to uniform illumination. For example, the edge pixels of a linear array may require greater or lesser integration times than the interior pixels in order to output the same response as the entire linear array is exposed to uniform illumination levels.

Gain Non-Uniformity (GNU) is a measure of the response variation (both positive and negative with respect to the average) within an image sensor chip compared to the average response from the entire image sensor chip. Positive Gain Non-Uniformity (PGNU) is a measure of the pixel with the maximum response versus the average response of all pixels, while Minus Gain Non-Uniformity (MGNU) is a measure of the pixel with the minimum response versus the average response of all pixels. It has been theorized that by compensating for the relative edge pixel to interior pixel responses, the overall GNU will be significantly reduced.

The present disclosure addresses a system and chip for adjusting integration times associated with edge and interior pixels within different photosensor sets in different chips which form a larger system.

SUMMARY

In an embodiment, a photosensor chip having a first set of photosensors including an edge pixel and an interior pixel and a control portion for accepting a first external integration signal, the first external integration signal causing an edge pixel integration signal and an interior pixel integration signal for the first set of photosensors. The control portion includes a first signal adjuster effectively altering the first external integration signal to cause the edge pixel integration signal and the interior pixel integration signal for the first set of photosensors.

In another embodiment, a photosensitive apparatus including a plurality of photosensor chips and a first common line for applying a first external integration signal to each of the plurality of photosensor chips. Each photosensor chip includes a first set of photosensors having an edge pixel and an interior pixel and a control portion for accepting the first external integration signal, the first external integration signal causing an edge pixel integration signal and an interior pixel integration signal for the first set of photosensors. The control portion includes a first signal adjuster effectively altering the first external integration signal to cause the edge pixel integration signal and the interior pixel integration signal for the first set of photosensors.

In yet another embodiment, a method of balancing signal outputs from a linear array of photosensors, the linear array of photosensors including an edge pixel and an interior pixel, the method including: a) integrating the edge pixel for an edge pixel integration duration; and, b) integrating the interior pixel for an interior pixel integration duration, wherein the edge pixel integration duration is different than the interior pixel integration duration.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong. Although any methods, devices or materials similar or equivalent to those described herein can be used in the practice or testing of these embodiments, some embodiments of methods, devices, and materials are now described.

U.S. Pat. No. 5,148,268, mentioned above, discloses a full width array apparatus used for the scanning and imaging of an image bearing surface. Such sensor chips are capable of measuring: streaking, i.e., undesired, narrow streaks of ink, toner or other colorants that extend along the process direction of the print sheet or image receptor (photoreceptor, intermediate belt or drum, etc.); and, banding, i.e., the presence of areas of bands of undesired anomalies (too dark, too light, wrong colors) in image quality, the bands extending in a direction perpendicular to the process direction of the print sheet or image receptor. Additionally, these sensor chips are capable of detecting how much toner is present on an image bearing surface and where such toner is present.

Figure 9:
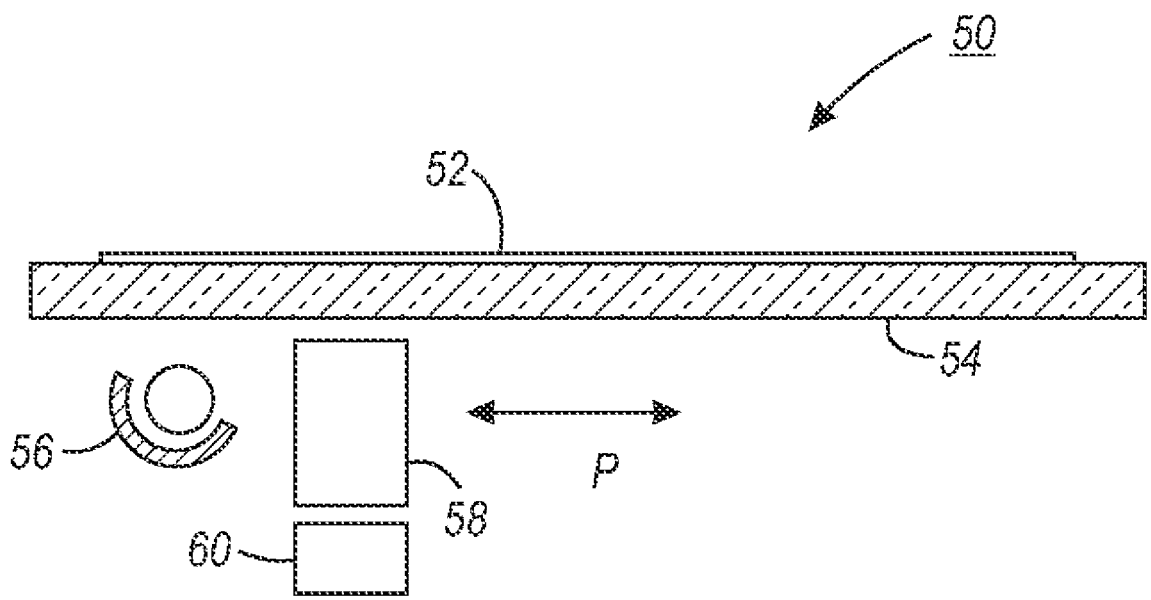

FIG. 9 shows a side elevational view of an example of a prior art scanner 50 which incorporates a linear array of photosensors. Scanner 50 includes image bearing surface 52 disposed on platen 54. The scanning assembly, which includes illuminator 56, optics 58 and linear array of photosensors 60, scans image bearing surface 52 by moving the entire assembly in the process direction P, while the linear array of photosensors 60 is arranged perpendicular to the process direction P, i.e., perpendicular to the plane of the page. Although not shown in the figures, image bearing surface 52 may also move over a stationary scanning assembly via a document feeder (not shown). At the outset, it should be appreciated that image printing systems generally have two important dimensions: a process (or slow scan) direction and a cross-process (or fast scan) direction. The direction in which the image or image bearing surface moves is referred to as the process direction, and the direction in which the plurality of sensors are oriented is referred to as the cross-process direction. The cross-process direction is generally perpendicular to the process direction.

Figure 1:
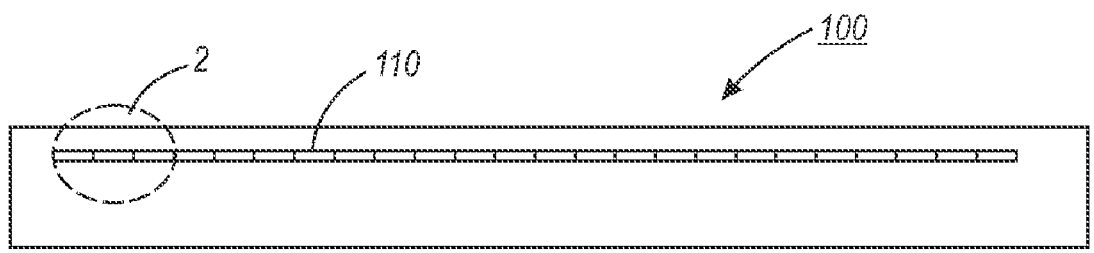
FIG. 1 is a plan view of a "full-width-array" input scanner as would be used in office equipment such as a digital copier and as would be used with an embodiment of a system and/or chip for adjusting integration times associated with edge and interior pixels of a set of photosensors.

FIG. 1 is a plan view of a "full-width-array" input scanner as would be used in office equipment such as a digital copier and as would be used with an embodiment of a system and/or chip for adjusting integration times associated with edge and interior pixels of a set of photosensors. Circuit board 100 includes a plurality of sets of photosensors arranged thereon, with each set of photosensors indicated as 110. Each chip 110 includes a set of photosensors, as described infra. Together, chips 110 on board 100 form one or more linear arrays of photosensors that extend a length comparable to the width of an image bearing surface, e.g., a photoreceptor belt or sheet of paper. As one of ordinary skill in the art appreciates, the image bearing surface can move relative to board 100 by being placed on a platen relative to which board 100 moves (as described above); or, the image bearing surface may be fed over board 100 via a document handler, for example. As the image bearing surface moves past board 100, a series of small areas on the image bearing surface reflect light from a source (as described above) into photosensors such as chips 110. Chips 110 receive the reflected light from the image bearing surface and output image signals for subsequent recording and processing. It should be appreciated that, as used herein, "image signal" is intended to mean the actual image-related output associated with each chip 110.

Figure 2:
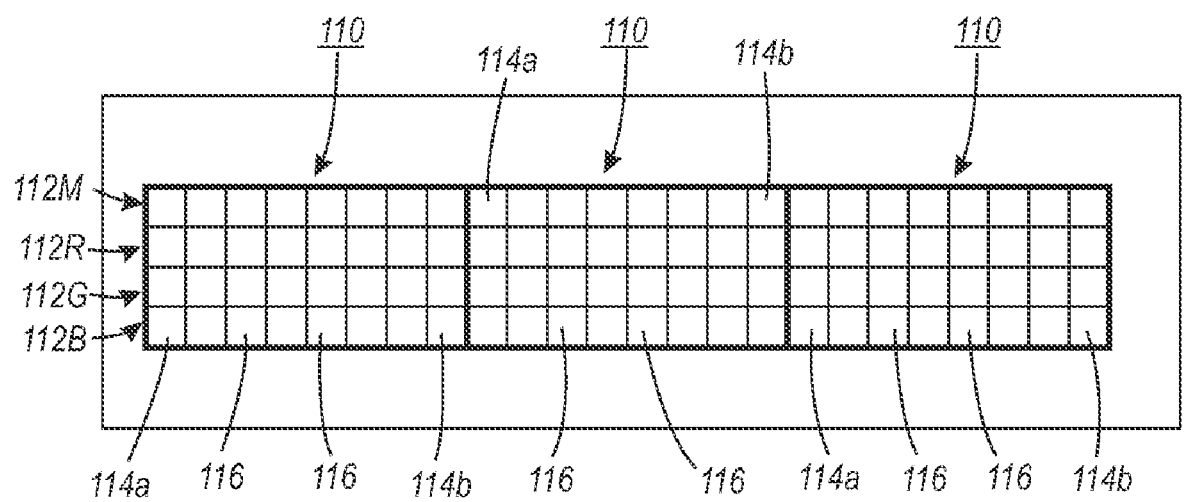
FIG. 2 is an enlarged plan view of the encircled region 2 of FIG. 1.

FIG. 2 is an enlarged plan view of the encircled region 2 of FIG. 1. FIG. 2 shows three photosensor chips 110 in isolation. In this embodiment, each chip 110 includes four linear arrays, or rows, of photosensors, labeled 112M (for monochrome), 112R (for red), 112G (for green) and 112B (for blue). Each array is provided with a translucent filter (not shown) that causes the array to be sensitive to a particular color or range of wavelength, e.g., red, green and/or blue. Monochrome array 112M is sensitive to light throughout the visible spectrum, and is useful when scanning images for monochrome-only image data, as would be useful, for example, in a monochrome copier or facsimile machine, or for optical character scanning. The photosensors may also be provided with other types of filters, such as for infrared blocking.

In the present embodiment, for each "column" (as shown in FIG. 2) of one photosensor of each type 112M, 112R, 112G and 112B, there is one output line to an output shift register. A general description of how multiple photosensors in a column send signals, e.g., image signals, over one line to a shift register is given in U.S. Pat. No. 5,148,168 mentioned above. It will be evident that each photosensor of each type 112M, 112R, 112G and 112B, in a column will "look at" one small area of an image being recorded, to obtain full color image data about the small area. A description of how the action of multiple photosensors of different colors must be coordinated is given in U.S. Pat. No. 5,519,514, mentioned above. Once a "scanline" of digital image signals is loaded into a shift register, the image data for that scanline is output from chip 110, such as through a video output line.

Each chip 110 comprises edge pixels and interior pixels. As best understood in view of FIG. 2, each "row" of photosensors includes edge pixels 114a and 114b located at each end of a respective "row" within each chip 110, while the pixels located therebetween are considered interior pixels 116. Thus, the two exterior "columns" of each chip 110 include edge pixels 114a and 114b, while each "column" therebetween includes interior pixels 116. It should be appreciated that although in the embodiments discussed herein edge pixels are shown as only the individual pixels located at the terminal ends of each respective chip 110, in some embodiments, edge pixels include more than just the individual terminal pixels, for example, edge pixels may include the first and last three pixels from each row of pixels, and such variations are within the spirit and scope of the claims. As described above, the photoresponse of the edge pixels at times has been found to be different than the photoresponse of the interior pixels, thereby resulting in larger GNU averages and distributions. (See discussion infra in view of FIGS. 7 and 8).

As mentioned above, a key control for a chip 110 is the start and stop times defining an "integration time" of each photosensor. An integration time is the length of time a particular photosensor receives light from a given small area, typically as the image bearing surface moves a series of small areas past each photosensor. In a multi-chip system, it may be desirable to make small adjustments in the integration time of a set of photosensors on the chip, and/or to make small adjustments in the integration time of edge pixels relative to interior pixels, such as to overcome manufacturing anomalies between a plurality of chips and within respective chips of the same apparatus. As is best understood in view of FIGS. 2 and 3, different lines for controlling the integration time of different subsets of photosensors, $\Phi F(M)$, $\Phi F(R)$, $\Phi F(G)$ and $\Phi F(B)$ (for monochrome, red, green and blue rows of photosensors, respectively) can be fed into a control portion, e.g., control portion 200, governing each chip 110.

Figure 3:
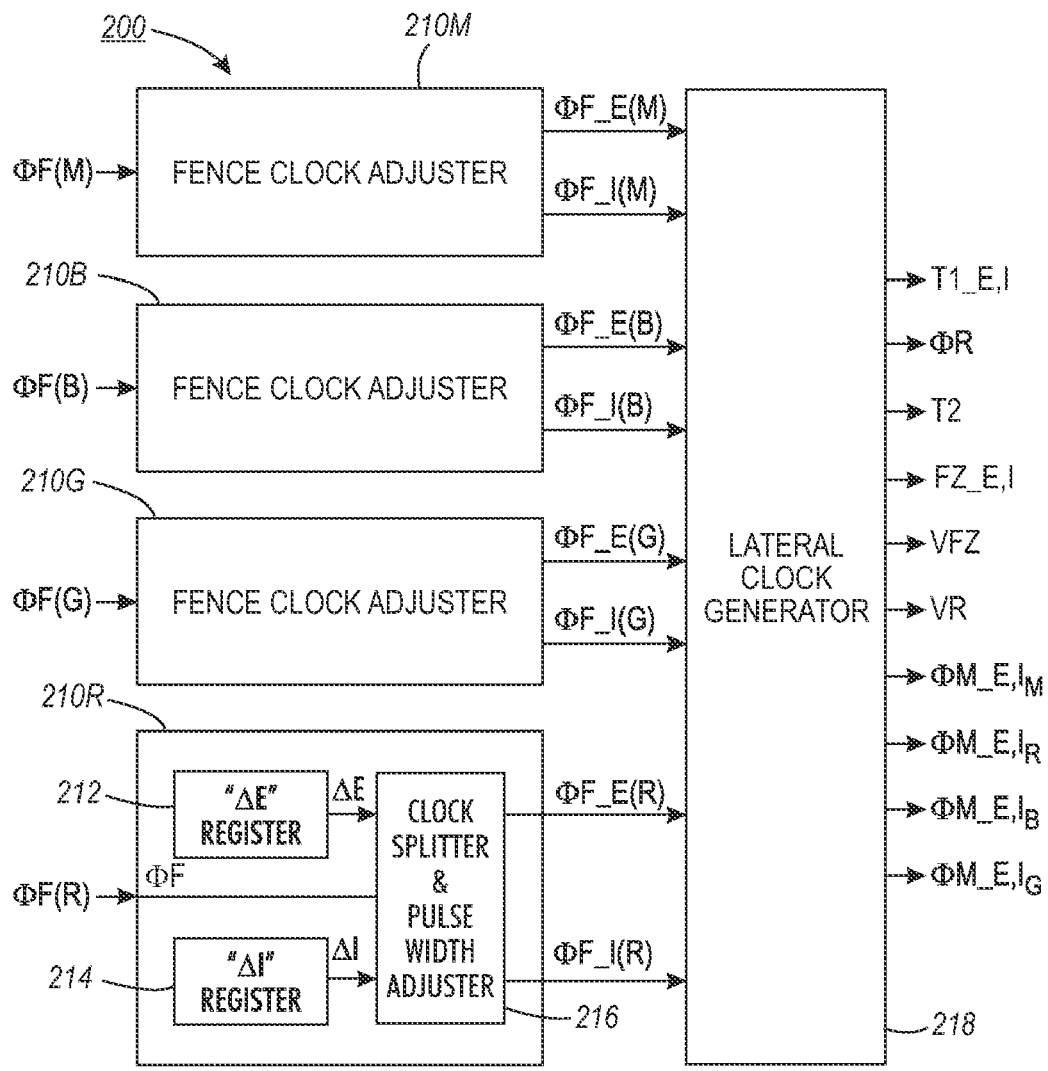
FIG. 3 is a block diagram of an embodiment of a chip for adjusting integration times associated with edge and interior pixels of a set of photosensors.

FIG. 3 is a simplified block diagram of an embodiment of a chip for adjusting integration times associated with edge and interior pixels of a set of photosensors, i.e., illustrating a principle of the present embodiment. In an embodiment, each chip 110 includes a control portion 200 associated therewith. As each chip 110 includes monochrome, red-filtered, green-filtered and blue-filtered sets of photosensors, each control portion 200 is arranged to received a corresponding integration signal for each set of photosensors, i.e., integration signals $\Phi F(M)$, $\Phi F(R)$, $\Phi F(G)$ and $\Phi F(B)$. It should be appreciated that each external line arranged to receive a particular integration signal, e.g., $\Phi F(R)$, for each control portion 200, may be linked together via a common line thereby permitting the transmission of an integration signal related to a particular photosensor set to all chips 110 simultaneously. Furthermore, it should be appreciated that, as used herein, "integration signal" is intended to mean a signal which instructs a photosensor or set of photosensor to start or stop an integration time/duration. In view of the foregoing, in a basic example, a going-high signal on $\Phi F(R)$ would cause all red photosensors on all chips 110 to start an integration time, and a going-low signal would cause all red photosensors on all chips 110 to end the integration time. The same principle applies to the monochrome, green and blue photosensors with the $\Phi F(M)$, $\Phi F(G)$ and $\Phi F(B)$. In this basic example, although all photosensors of each color on each chip 110 are controlled through a common line for their respective integration times, chip-to-chip adjustments in integration times may be affected by the storage of chip specific calibration data as described infra, thereby overcoming manufacturing anomalies between chips.

FIG. 3 further shows in detail a representative portion of control portion 200. At the input lines for each external input $\Phi F(M)$, $\Phi F(R)$, $\Phi F(G)$ and $\Phi F(B)$, there is provided what can be called a "signal adjuster," one for each color line, and marked 210M, 210R, 210G and 210B, respectively. The function of each signal adjuster is to effectively alter the incoming external integration signal, e.g., the external integration signal received by input $\Phi F(R)$, to cause modified integration times for each edge pixel and each interior pixel within each set of photosensors. Thus, the external integration signal is accepted by signal adjuster 210R, and is combined with an edge pixel integration offset stored in the storage register denoted as "'$\Delta E$' REGISTER" and marked 212, and combined with an interior pixel integration offset stored in the storage register denoted as "'$\Delta I$' REGISTER" and marked 214. The foregoing combination occurs in the "clock splitter & pulse width adjuster" marked 216. Thus, in an embodiment, each signal adjuster such as 210R accepts the common external integration signal going simultaneously to all chips in the board 100; but, for the particular chip, outputs an altered integration signal for each of the edge and interior pixels, i.e., $\Phi F\_E(R)$ and $\Phi F\_I(R)$, respectively, which has the effect of altering the integration time for the edge and interior pixels of the red photosensors in some way. The altered integration signals, which include both an edge pixel integration signal and an interior pixel integration signal, are then fed into lateral clock generator 218 which uses the respective signals to control the integration time of the edge and interior pixels of the red photosensors in the same manner as an entire array is controlled in the known art. For example, lateral clock generator 218 is arranged to generate edge and interior transfer gate signals (T1_E,I), a signal to reset the node ($\Phi R$), a second transfer gate signal (T2), edge and interior fat zero clocks (FZ_E,I), a photodiode reset (VFZ), a reset voltage (VR) and edge and interior muxing signals for each respective set of photosensors ($\Phi M\_E,I_M$; $\Phi M\_E,I_R$; $\Phi M\_E,I_G$; and, $\Phi M\_E,I_B$). It should be appreciated that, as used herein, "transfer gate signals" and "muxing signals" are intended to mean signals which provide various instructions to each photosensor, for example, to start an integration time.

One possible way a signal adjuster, e.g., signal adjuster 210R, can alter the incoming external integration signal $\Phi F(R)$ is to effectively subtract from the duration of the signal (between going-high and going-low), by a predetermined amount stored in registers 212 and 214. The adjustment to the length of the incoming signal (to yield the modified signals shown as $\Phi F\_E(R)$ and $\Phi F\_I(R)$) will correspond to a change in the integration times for the edge and interior pixels of the red photosensors when the modified signals are applied to the lateral clock generator 218. It should be appreciated that the foregoing discussion, of course, applies to the $\Phi F(M)$, $\Phi F(G)$ and $\Phi F(B)$ signals as well, and the different sets of photosensors, controlled by different input external integration signals, can operate substantially independently within a single chip 110, and between separate chips 110.

Figure 4:
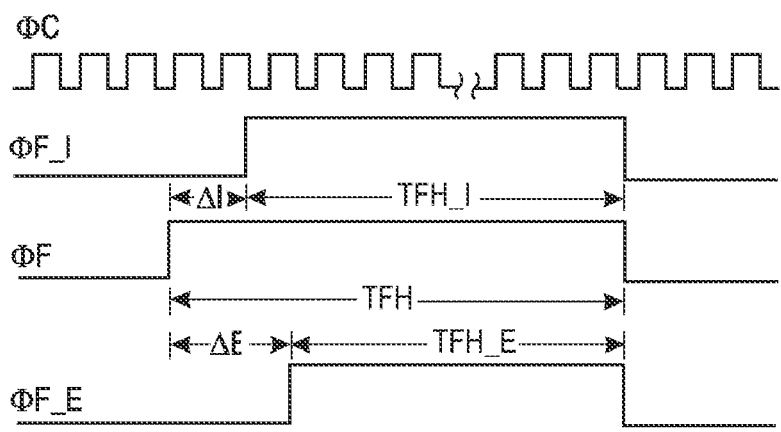
FIG. 4 is a timing diagram illustrating a principle of the embodiment shown in FIG. 3.

FIG. 4 is a timing diagram illustrating a principle of the embodiment shown in FIG. 3, i.e., showing the operation of a signal adjuster such as 210R, among each of a set of chips 110. In the FIG. 4 embodiment, a generalized input external integration signal $\Phi F$, having a signal length of TFH, is modified in length by the calibration values stored in registers 212 and 214, i.e., modified by $\Delta E$ and $\Delta I$, respectively. Thus, $\Phi F\_E$ has a length of TFH_E which is equivalent to (TFH-$\Delta E$), while $\Phi F\_I$ has a length of TFH_I which is equivalent to (TFH-$\Delta I$). Accordingly, in this embodiment, the system is designed so that the end points of all the modified signals, i.e., edge pixel integration signal and interior pixel integration signal, are simultaneous with the endpoint of the input external integration signal. This embodiment may be useful when coordinating the integration times with readout circuitry (not shown), particularly in chip designs where video is output in response to a falling edge of an input external integration signal.

Figure 5:
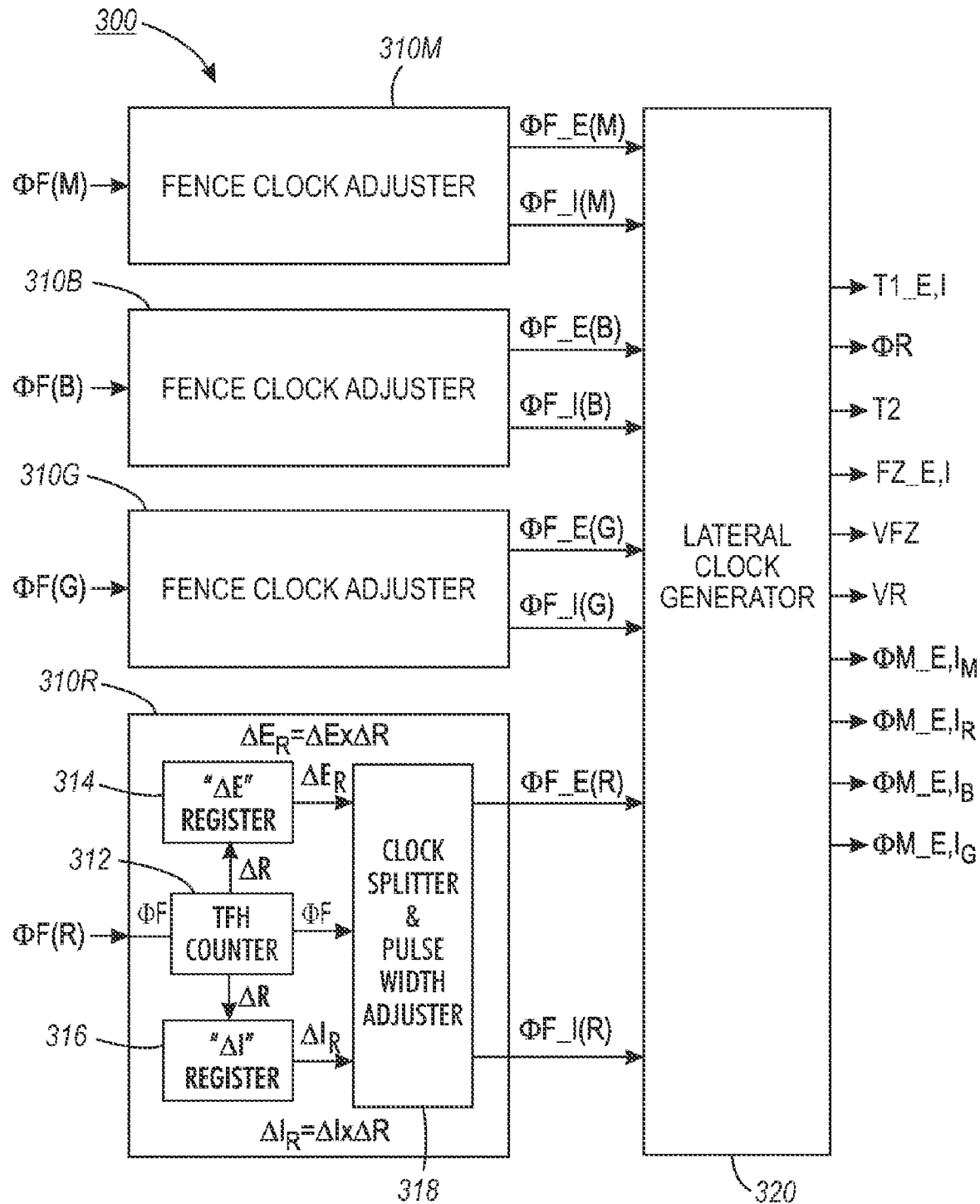
FIG. 5 is a block diagram of another embodiment of a chip for adjusting integration times associated with edge and interior pixels of a set of photosensors.

FIG. 5 is a simplified block diagram of another embodiment of a chip for adjusting integration times associated with edge and interior pixels of a set of photosensors, i.e., illustrating another principle of the present embodiment. In an embodiment, each chip 110 includes a control portion 300 associated therewith. The arrangement of each chip 110 is similar to the arrangement described in the embodiment above and therefore is not repeated with respect to this embodiment.

FIG. 5 further shows in detail a representative control portion 300. At the input lines for each external input ΦF(M), ΦF(R), ΦF(G) and ΦF(B), there is provided what can be called a "signal adjuster," one for each color line, and marked 310M, 310R, 310G and 310B, respectively. The function of each signal adjuster is to effectively alter the incoming external integration signal, e.g., the external integration signal received by input ΦF(R), to cause modified integration times for each edge pixel and each interior pixel within each set of photosensors. This embodiment addresses the issue of how to adjust respective edge and interior pixel integration times when the external integration signal is greater than 256 main clock cycles in length. It should be appreciated that the timing of an apparatus is typically controlled by a main clock cycle, for example, an integration signal may be equivalent to 1,000 main clock cycles. In such an arrangement, 8-bit registers, e.g., registers 314 and 316, may not be able to sufficiently adjust the external integration signal to effectively balance the output of the edge and interior pixels having a maximum adjustment of 256 clock cycles, i.e., 8-bits permits a maximum adjustment of 28 clock cycles. In view of the foregoing, the adjustment value produced by the respective signal adjusters may require scaling according to the overall length of the external integration signal. Thus, in this embodiment, the external integration signal, e.g., the signal received by input ΦF(R), is first received by counter 312 within signal adjuster 310R. Counter 312 outputs a value that is proportional to the total number of main clock cycles contained within the external integration signal, e.g., counter 312 outputs a value of one if the external integration signal comprises less than or equal to 256 main clock cycles, the counter outputs a value of two if the external integration signal comprises less than or equal to 512 main clock cycles and greater than 256 main clocks cycles, etc. Subsequently, the values stored within registers 314 and 316 are scaled or multiplied by the value output by counter 312, i.e., $\Delta R$.

Thus, the external integration signal is accepted by signal adjuster 310R, counter 312 determines the value $\Delta R$, $\Delta R$ is multiplied by the edge and interior pixels offset values stored within registers 314 and 316, respectively, and these values, $\Delta E_R$ and $\Delta I_R$, respectively, are combined with the external integration signal thereby resulting in ΦF_E(R) and ΦF_I(R), respectively. The foregoing combination occurs in the "clock splitter & pulse width adjuster" marked 318. Thus, in an embodiment, each signal adjuster such as 310R accepts the common external integration signal going simultaneously to all chips in the board 100; but, for the particular chip, outputs an altered integration signal for each of the edge and interior pixels, i.e., ΦF_E(R) and ΦF_I(R), respectively, which has the effect of altering the integration time for the edge and interior pixels of the red photosensors in some way. The altered integration signals, which include both an edge pixel integration signal and an interior pixel integration signal, are then fed into lateral clock generator 320 which uses the respective signals to control the integration time of the edge and interior pixels of the red photosensors in the same manner as an entire array was controlled in the known art.

Figure 6:
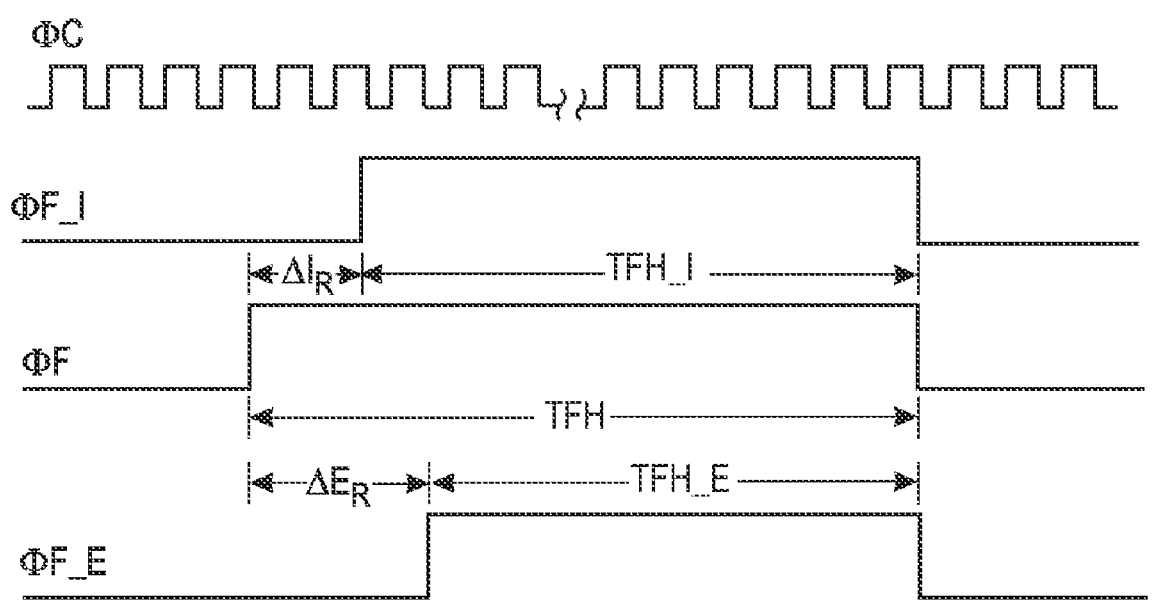
FIG. 6 is a timing diagram illustrating a principle of the embodiment shown in FIG. 5.

FIG. 6 is a timing diagram illustrating a principle of the embodiment shown in FIG. 5, i.e., showing the operation of a signal adjuster such as 310R, among each of a set of chips 110. In the FIG. 6 embodiment, a generalized input external integration signal ΦF, having a signal length of TFH is modified in length by the calibration values stored in registers 314 and 316, i.e., modified by $\Delta E_R$ and $\Delta I_R$, respectively. Thus, ΦF_E has a length of TFH_E which is equivalent to (TFH-$\Delta E_R$), while ΦF_I has a length of TFH_I which is equivalent to (TFH-$\Delta I_R$). Accordingly, in this embodiment, the system is designed so that the end points of all the modified signals, i.e., edge pixel integration signal and interior pixel integration signal, are simultaneous with the endpoint of the input external integration signal. The foregoing embodiment effectively improves the resolution of the offset so that integration times in excess of 256 main clock cycles (ΦC) may be adjusted as finely as integrations times less than 256 main clock cycles. It should be appreciated that registers 314 and 316 may be greater than or less than 8-bit registers, and in such embodiments, counter 312 will provide a $\Delta R$ value in accordance with the maximum possible numeric output of each register. For example, the $\Delta R$ value will increment each time counter 312 reaches a multiple of 16 if registers 314 and 316 are 4-bit registers, or the $\Delta R$ value will increment each time counter 312 reaches a multiple of 65536 if registers 314 and 316 are 16-bit registers. Such embodiments of registers are within the spirit and scope of the claims.

In one possible embodiment, for a given chip 110, following manufacture and perhaps following installation into a larger, multi-chip apparatus, the signal output from the edge pixels and the interior pixels from a particular set of photosensors on the chip is measured, e.g., voltage output from each pixel in response to an illumination level; and, then correction data (such as 8-bit words) are loaded into and stored in the registers (for example, registers 212 and 214) within the corresponding signal adjusters such as 210M, 210R, 210G and 210B, to cause subsequent outputs from the signal adjuster to change the signal output of a set of photosensors to be more consistent by separately adjusting the integration signals of the edge pixels and the interior pixels. In a practical implementation, loading of this correction data is required only at manufacture of an apparatus such as a scanner, but in some embodiments, changing the correction data to each signal adjuster on each chip in an apparatus over the course of use may be desirable.

The above-described system, in which each edge pixel and each interior pixel of each set of photosensors on each chip can be controlled by a modified integration signal within the chip, enables each edge pixel and each interior pixel of each set of photosensors on each chip in a larger system to be finely adjusted in terms of integration time. In a practical implementation, this adjustment of the integration times can be used to overcome manufacturing anomalies among chips (and photosensor sets within a chip), so that the amplitude of a video signal from all the sets of photosensors on all chips in an apparatus will be consistent. Moreover, it should be appreciated that with the foregoing system each discrete pixel, edge and interior, may be adjusted independently of all other pixels thereby resulting in even greater control of video signal outputs, and such embodiments are within the spirit and scope of the claims.

It should be appreciated in view of the foregoing that an embodiment includes a method of balancing signal outputs from a linear array of photosensors, where the linear array of photosensors comprising an edge pixel and an interior pixel. The method comprises: a) integrating the edge pixel for an edge pixel integration duration; and, b) integrating the interior pixel for an interior pixel integration duration, wherein the edge pixel integration duration is different than the interior pixel integration duration. In an embodiment, the signal outputs are considered balanced when a signal output (e.g., voltage output from a pixel in response to an illumination level) from the edge pixel is substantially the same as a signal output from the interior pixel upon exposure of the linear array of photosensors to a uniform illumination. The modification of integration signals may take several forms which include, but are not limited to, the following example embodiments. In an embodiment, the edge pixel integration duration begins at a different time than the interior pixel integration duration, and the edge pixel integration duration ends simultaneously with the edge pixel integration duration. In another embodiment, the edge pixel integration duration begins simultaneously with the interior pixel integration duration, and the edge pixel integration duration ends at a different time than the edge pixel integration duration. In yet another embodiment, the edge pixel integration duration begins at a different time than the interior pixel integration duration, and the edge pixel integration duration ends at a different time than the edge pixel integration duration. The foregoing embodiments are included for illustrative purposes and are not intended to limit the scope of the claimed embodiments.

Figure 7:
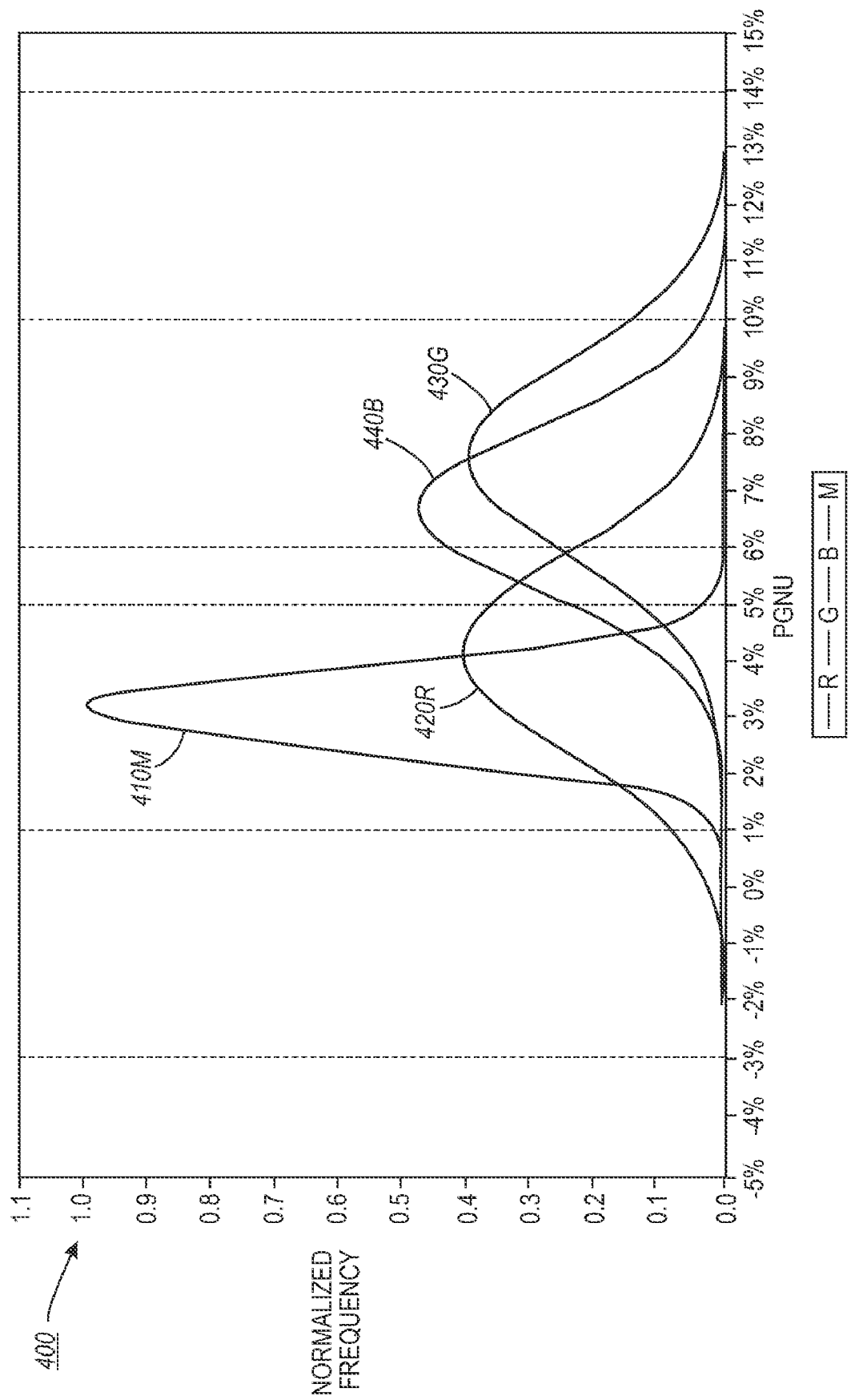
FIG. 7 is a graph showing an analysis of Positive Gain Non-Uniformity for a photosensor chip prior to incorporating an embodiment of a chip for adjusting integration times associated with edge and interior pixels of a set of photosensors.
Figure 8:
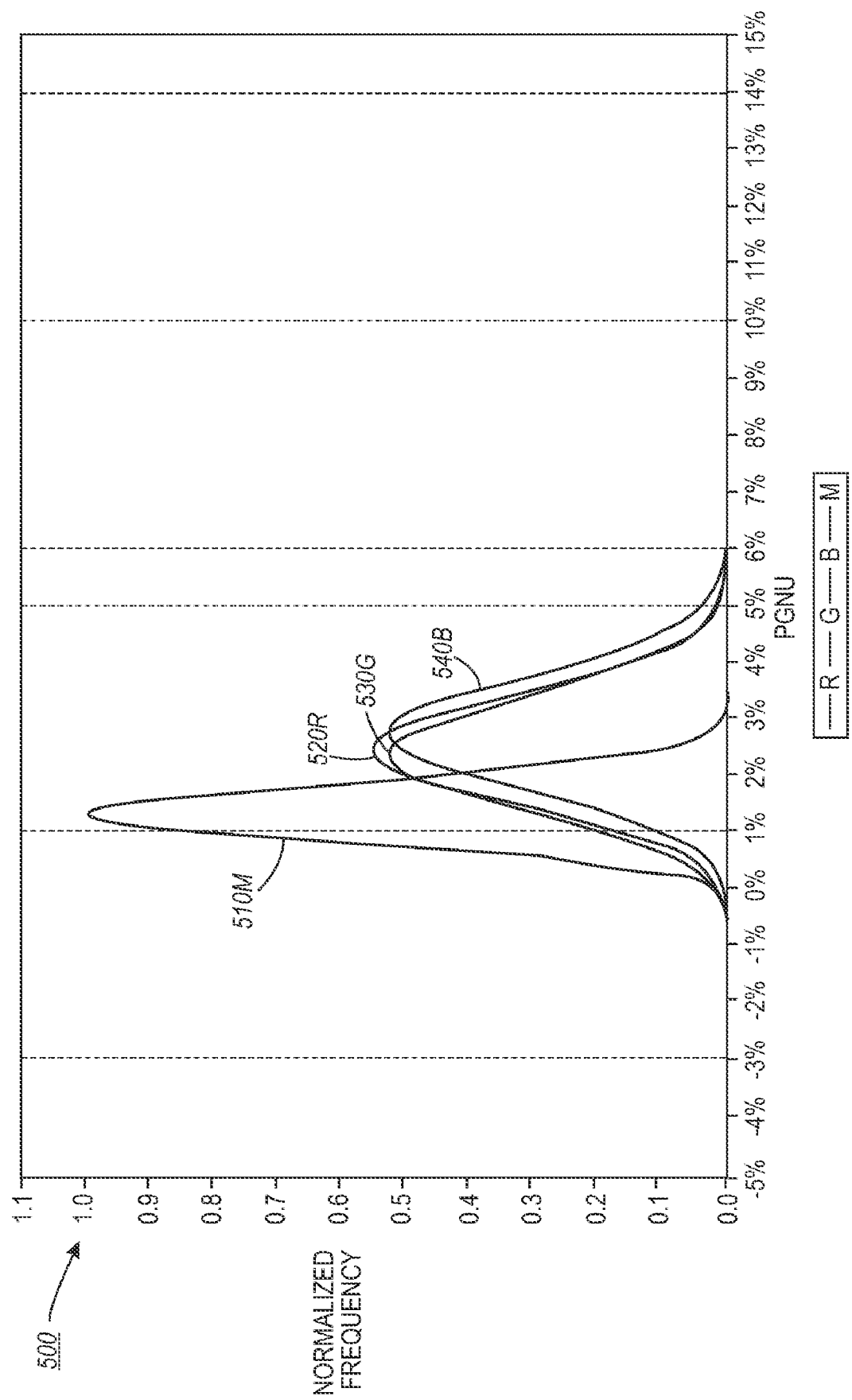
FIG. 8 is a graph showing an analysis of Positive Gain Non-Uniformity for a photosensor chip after incorporating an embodiment of a chip for adjusting integration times associated with edge and interior pixels of a set of photosensors; and, FIG. 9 is a side elevational view of a prior art scanner which incorporates a linear array of photosensors.

FIG. 7 shows a graph depicting an analysis of Positive Gain Non-Uniformity for a photosensor chip prior to incorporating an embodiment of a chip for adjusting integration times associated with edge and interior pixels of a set of photosensors, while FIG. 8 shows a graph showing an analysis of Positive Gain Non-Uniformity for a photosensor chip after incorporating an embodiment of a chip for adjusting integration times associated with edge and interior pixels of a set of photosensors. As can be seen in the example shown in FIG. 7, a linear array may comprise average PGNU values of approximately 3.25% for monochrome photosensors (marked 410M), approximately 4.0% for monochrome photosensors (marked 420R), approximately 7.75% for monochrome photosensors (marked 430G) and approximately 6.5% for monochrome photosensors (marked 440B). Additionally, as can be seen in FIG. 7, the distributions of respective PGNU values are quite broad. As can be seen in FIG. 8, after incorporating a chip/system for adjusting edge and interior pixel integration times, both average PGNU values and respective distributions improve. The resulting PGNU average values for monochrome photosensors is approximately 1.25% (marked 510M), for red photosensors is approximately 2.5% (marked 520R), for green photosensors is approximately 2.5% (marked 530G) and for blue photosensors is approximately 3.0% (marked 540B).

In contrast with the present disclosure, a system of simply adjusting gain would not change the signal-to-noise ratio because any noise would also be adjusted equally; and, adjusting gain also adjusts offset, which is not desirable. Changing the integration time, as in the present disclosure, is effectively the same as adjusting the light level on the photosensors, and thus will not have an adverse effect on signal-to-noise ratio. In addition, adjusting integration time to equalize signals, as in the present disclosure, requires less of the signal range to be allocated to correction, which further enables a higher signal-to-noise ratio.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A photosensor chip comprising:
   a first set of photosensors comprising an edge pixel and an interior pixel; and,
   a control portion for accepting a first external integration signal, said first external integration signal causing an edge pixel integration signal and an interior pixel integration signal for said first set of photosensors, said control portion comprising:
      a first signal adjuster effectively altering said first external integration signal to cause said edge pixel integration signal and said interior pixel integration signal for said first set of photosensors said first signal adjuster accepts an edge pixel datum instructing said first signal adjuster to cause said edge pixel integration signal to be different from said first external integration signal by a predetermined edge pixel duration, said predetermined edge pixel duration being related to said edge pixel datum, and said first signal adjuster accepts an interior pixel datum instructing said first signal adjuster to cause said interior pixel integration signal to be different from said first external integration signal by a predetermined interior pixel duration, said predetermined interior pixel duration being related to said interior pixel datum.

2. The photosensor chip according to claim 1, wherein said first signal adjuster effectively causes said edge pixel integration signal and said interior pixel integration signal to be different from said first external integration signal by a predetermined edge pixel duration and a predetermined interior pixel duration, respectively.

3. The photosensor chip according to claim 1, wherein said first external integration signal comprises a duration, said duration comprising a plurality of clock cycles, said control portion further comprising:
   a first counter outputting a multiplier value upon reaching a predetermined number of said plurality of clock cycles, said multiplier value is proportional to said predetermined number and causes said first signal adjuster to effectively alter said first external integration signal to cause said edge pixel integration signal and said interior pixel integration signal for said first set of photosensors, wherein said edge pixel integration signal and said interior pixel integration signal are proportional to said multiplier value.

4. The photosensor chip according to claim 3, said control portion further comprising:
   a clock generator receiving said edge pixel integration signal and said interior pixel integration signal for said first set of photosensors and effectively using said edge and interior pixel integration signals to cause respective first edge transfer gate signals and first interior transfer gate signals, to further cause respective first edge fat zero clock signals and first interior fat zero clock signals, and to yet further cause respective first edge muxing signals and first interior muxing signals for said photosensor chip.

5. The photosensor chip according to claim 1, said control portion further comprising:
   a clock generator receiving said edge pixel integration signal and said interior pixel integration signal for said first set of photosensors and effectively using said edge and interior pixel integration signals to cause respective first edge transfer gate signals and first interior transfer gate signals, to further cause respective first edge fat zero clock signals and first interior fat zero clock signals, and to yet further cause respective first edge muxing signals and first interior muxing signals for said photosensor chip.

6. The photosensor chip according to claim 1 further comprising:

a second set of photosensors comprising an edge pixel and an interior pixel; and, said control portion accepting a second external integration signal, said second external integration signal causing an edge pixel integration signal and an interior pixel integration signal for said second set of photosensors, said control portion further comprising:

a second signal adjuster effectively altering said second external integration signal to cause said edge pixel integration signal and said interior pixel integration signal for said second set of photosensors.

7. The photosensor chip according to claim 6, wherein said first set of photosensors is sensitive to a first color and said second set of photosensors is sensitive to a second color.

8. A photosensitive apparatus comprising:
a plurality of photosensor chips, each photosensor chip comprising:
a first set of photosensors comprising an edge pixel and an interior pixel; and,
a control portion for accepting a first external integration signal, said first external integration signal causing an edge pixel integration signal and an interior pixel integration signal for said first set of photosensors, said control portion comprising:
a first signal adjuster effectively altering said first external integration signal to cause said edge pixel integration signal and said interior pixel integration signal for said first set of photosensors; and,
a first common line for applying said first external integration signal to each of said plurality of photosensor chips a first counter outputting a multiplier value upon reaching a predetermined number of said plurality of clock cycles, said multiplier value is proportional to said predetermined number and causes said first signal adjuster to effectively alter said first external integration signal to cause said edge pixel integration signal and said interior pixel integration signal for said first set of photosensors, wherein said edge pixel integration signal and said interior pixel integration signal are proportional to said multiplier value.

9. The photosensitive apparatus according to claim 8, said control portion of each photosensor chip further comprising:
a clock generator receiving said edge pixel integration signal and said interior pixel integration signal for said first set of photosensors and effectively using said edge and interior pixel integration signals to respective first edge transfer gate signals and first interior transfer gate signals, to further cause respective first edge fat zero clock signals and first interior fat zero clock signals, and to yet further cause respective first edge muxing signals and first interior muxing signals for said photosensor chip.

10. The photosensitive apparatus of claim 8 further comprising:
a second common line for applying a second external integration signal to each of said plurality of photosensor chips; and,
each photosensor chip further comprising:
a second set of photosensors comprising an edge pixel and an interior pixel; and,
said control portion accepting said second external integration signal, said second external integration signal causing an edge pixel integration time and an interior pixel integration time for said second set of photosensors, said control portion further comprising:
a second signal adjuster effectively altering said second external integration signal to cause said edge pixel integration signal and said interior pixel integration signal for said second set of photosensors.

11. The photosensitive apparatus of claim 10, wherein, for each photosensor chip, said first set of photosensors is sensitive to a first color and said second set of photosensors is sensitive to a second color.

* * * * *